United States Patent
Viti

(10) Patent No.: US 6,541,936 B2
(45) Date of Patent: Apr. 1, 2003

(54) START PROCEDURE FOR BRUSHLESS MOTORS

(75) Inventor: Marco Viti, Cornaredo (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/907,549

(22) Filed: Jul. 17, 2001

(65) Prior Publication Data

US 2002/0033688 A1 Mar. 21, 2002

(30) Foreign Application Priority Data

Jul. 19, 2000 (EP) .............................. 00830510

(51) Int. Cl.[7] .............................................. H02P 7/36
(52) U.S. Cl. .................... 318/727; 318/728; 318/254; 318/138; 318/439
(58) Field of Search ................... 318/254, 138, 318/439, 727, 728

(56) References Cited

U.S. PATENT DOCUMENTS

| 4,876,491 A |   | 10/1989 | Squires et al. ............. 318/138 |
|---|---|---|---|
| 5,097,191 A | * | 3/1992 | Bahn ........................ 318/701 |
| 5,117,165 A | * | 5/1992 | Cassat et al. ............. 318/138 |
| 5,206,567 A | * | 4/1993 | Sakurai et al. ............ 318/254 |
| 5,569,990 A | * | 10/1996 | Dunfield .................... 318/254 |
| 5,841,252 A | * | 11/1998 | Dunfield .................... 318/254 |
| 5,844,394 A | * | 12/1998 | Mushika et al. ........... 318/685 |
| 6,249,101 B1 | * | 6/2001 | Viti et al. .................. 318/138 |

FOREIGN PATENT DOCUMENTS

| EP | 0945975 | 9/1999 | ............ H02P/6/22 |
|---|---|---|---|
| WO | 90/10973 | 9/1990 | ............ H02P/6/02 |

* cited by examiner

*Primary Examiner*—Rita Leykin
(74) *Attorney, Agent, or Firm*—Allen, Dyer, Doppelt, Milbrath & Gilchrist, P.A.; Lisa K. Jorgenson

(57) ABSTRACT

A start-up procedure for a multiphase brushless motor to be accelerated until reaching a certain speed includes determining the starting position of the rotor and performing an excitation phase including forcing a drive current in the phase windings of the motor for an established period of time. This is done according to a switching sequence for inducing a rotation in the desired direction. Furthermore, the method may include sensing the position reached by the rotor at the end of each excitation phase. The start-up procedure is eventually interrupted when the established speed has been reached or exceeded. Additionally, the duration of a next phase of excitation may be increased or reduced, and the switching sequence may be modified, based upon the number of consecutive times in which the current position is found to be the same or different from the previously detected position, respectively.

32 Claims, 2 Drawing Sheets

START PROCEDURE FOR BRUSHLESS MOTORS

FIELD OF THE INVENTION

The present invention relates to electric motors, and, more particularly, to multiphase DC brushless motors (typically three-phase motors) and to a start-up procedure for accelerating the rotor of such a motor until it reaches a predetermined speed.

BACKGROUND OF THE INVENTION

A brushless motor has a permanent magnet rotor and a stator including a certain number of windings (commonly three) typically connected in a star or polygonal (i.e., triangle or delta) configuration. In addition to the conventional star or polygonal configurations, the windings may also be configured according to a so-called "independent phase" configuration, where both terminals of each phase winding may be accessed externally and driven independently from the other phase windings.

In the most common case of star or triangle configured three-phase motors, the windings are driven by integrated circuits whose output stage generally includes a full wave three-phase bridge circuit made up of six bipolar or metal oxide semiconductor (MOS) power transistors. A typical output stage and three-phase DC brushless motor for connection thereto is shown in FIG. 1.

The most typical driving mode associated with a motor of this type is the so-called "bipolar" mode, in which at each instant two windings are driven while the third is in a high impedance state (tristate). The phase windings being driven are switched according to a cyclic sequence that should be synchronized with the instantaneous position of the rotor (i.e., of its magnetic axis or axes). In a bipolar driving mode, this may be easily established by monitoring the sensed back electromotive force (BEMF) of the phase winding that is in the high impedance state, or through dedicated position sensors.

To improve the performance of the system, the windings should be switched such that the motor may operate at the maximum efficiency level. This is achieved by maintaining a precise phase relationship between the current forced through the winding and the BEMF induced thereon. Start-up is accomplished by switching to supply the windings according to a certain switching sequence. This is done to induce a rotation to a successive position in the desired direction at a progressively increasing speed until the motor reaches a certain speed.

It is not possible to verify that the motor is indeed rotating in the desired manner by sensing the BEMF during such an acceleration phase, as it is done during the normal running of the motor. Indeed, until an adequate speed is reached, the back electromotive signal does not have a sufficient amplitude to be reliably used to sense the speed and position of the rotor.

A method for controlling the speed of the rotor includes sensing the position of the rotor at predetermined intervals of time while the motor is excited according to an electric current path chosen as a function of the position. This is done to induce the desired rotation. In particular, U.S. Pat. No. 4,876,491 to Squires et al. discloses a method in which the speed of the rotor is controlled by detecting the position of the rotor at predetermined periods of time. This is done by carrying out measurements on all the windings and, consequently, selecting the appropriate excitation current path. Basically, the disclosed method includes excitation phases, during which an acceleration is impressed upon the rotor, alternated with rotor position sensing phases during which the speed remains practically constant.

To rapidly bring the motor to a desired speed, it is desired to increase the duration of the excitation phases as much as possible and minimize the duration of the sensing phases. According to the above method, the excitation phases have an equal duration of time. Thus, at high speeds there exists the possibility that, by exciting a winding for a relatively long period, the rotor may surpass the excited winding and be slowed down. On the other hand, if the excitation phases were too short, the acceleration characteristics of the rotor would be reduced. In addition, each sensing phase would be relatively long, and therefore a longer time will be required to bring the rotor to the required speed.

SUMMARY OF THE INVENTION

It is an object of the present invention to provide a start-up procedure for a brushless motor including excitation phases whose duration are progressively reduced as the speed of the rotor increases and vice-versa, and sensing phases whose duration are diminished with respect to prior art methods.

This and other objects, features, and advantages according to the invention are provided by a method including determining the start-up position of the rotor, forcing a current through the motor's windings for an established period of time and, at the end of each of the excitation phases, determining the position of the rotor. A distinguishing feature of the invention is that the duration of the excitation phases is not constant as in prior art methods. On the contrary, it is updated depending upon the number of consecutive times in which the rotor is sensed to be in the same position or in a different position.

The position of the rotor may be sensed by inductance measurements carried out at the end of each excitation phase. The inductance measurements may include forcing short current pulses into the windings and determining which of them has the minimum electric time constant (i.e., inductive sensing). Further, such a test need not be performed on all the windings but rather on a restricted number of them, i.e., on those functionally closest to the previously sensed position of the rotor.

The start-up procedure of the invention may be terminated to proceed with a classic driving mode of the motor based on sensing BEMF when the speed of the rotor has reached or surpassed a predetermined value, or when the rotor has simultaneously reached the desired speed and position. Additionally, the procedure of invention can be stopped and an alarm signal generated if the desired speed is not reached after a certain maximum allowable time has elapsed from the beginning of the start-up.

BRIEF DESCRIPTION OF THE DRAWINGS

The various aspects and advantages of the invention will become more apparent through the following detailed description, and by referring to the attached drawings, in which.

DETAILED DESCRIPTION OF THE PREFERRED EMBODIMENTS

Figure 1:
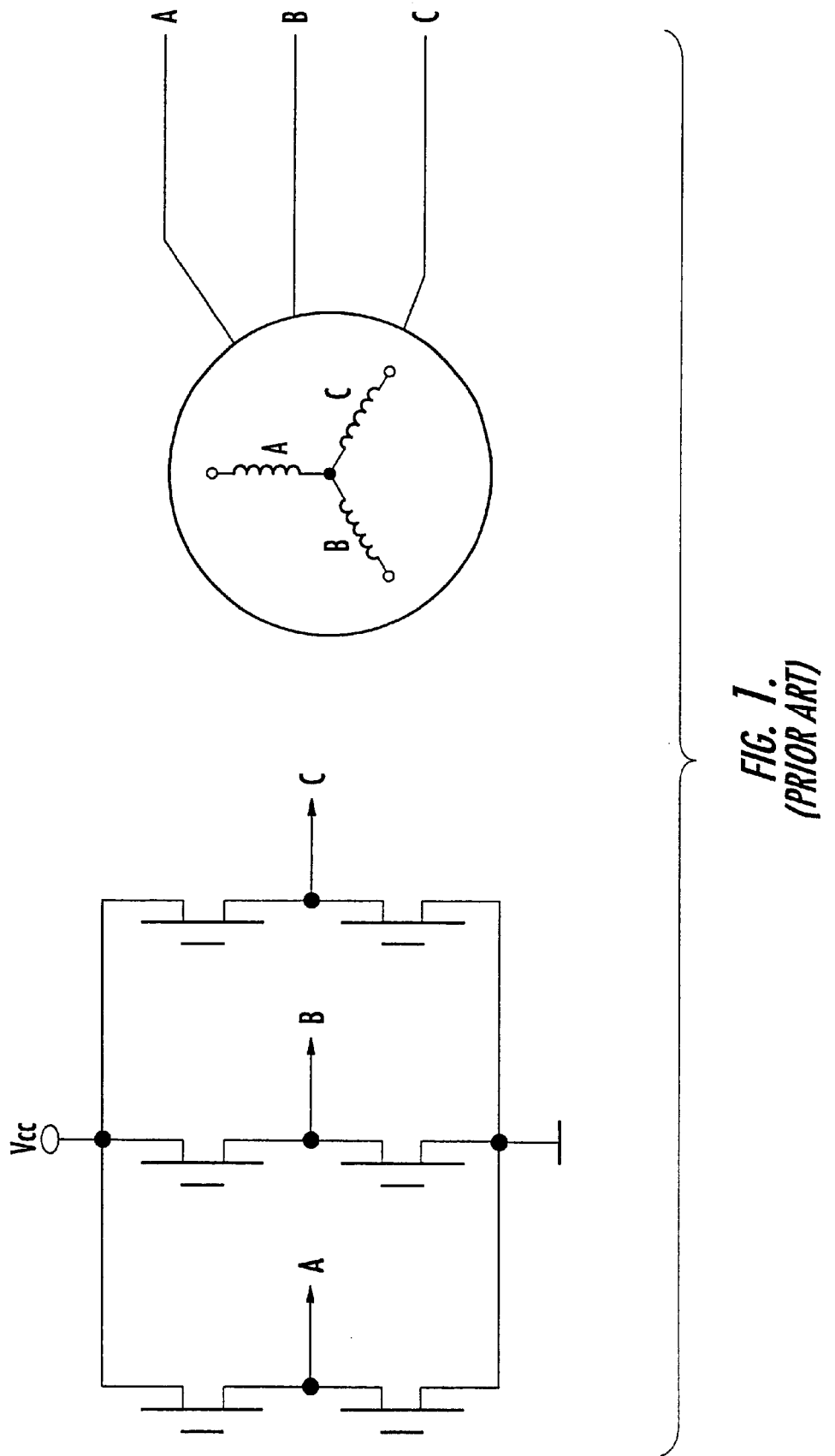
FIG. 1 is a schematic diagram of a three-phase full-bridge driving stage and a star-configured three-phase DC brushless motor for connection thereto according to the prior art.

The start-up procedure of the invention includes determining the initial position of the rotor, i.e., by inductive sensing analysis to all the possible configurations or by ensuring that the rotor is aligned with a predetermined position (alignment) before it is started. Once the position of the rotor is determined or imposed by any suitable means, an excitation phase is carried out by forcing a current through the windings according to a certain switching scheme, and for an established period of time.

Thereafter, the position of the rotor is sensed, preferably by carrying out tests that may be advantageously limited to positions functionally near the last known position of the sensor. To detect the current position of the rotor, it may be required to test all possible positions and to verify which one is truly aligned with the magnetic axis of the rotor. This is because if the speed of the motor and the duration of each excitation phase are relatively small, it would be useless to test angular positions that are immediately before the last sensed position. That is, the angular positions could hardly have been reached by the rotor.

It has been found that it is sufficient to test positions including the last sensed position and a few successive positions to find the new angular position reached by the rotor. In this manner, the duration of the sensing phase, during which the rotor is not accelerated, may be reduced. Depending on the number of consecutive excitation phases of the same duration in which the rotor may have translated from a certain position to a new one, the duration of each excitation phase and the switching sequence are modified. This increases or decreases the angular distance between the sensed position and the winding to be excited next. If this adjusted duration of the new excitation phase is insufficient to move the rotor, then the winding that immediately follows the sensed position of the rotor is excited rather than exciting a relatively more distant one to produce the maximum torque.

One particular advantage of producing excitation phases of variable duration is that at relatively high speeds the duration may be reduced. This prevents the rotor, having surpassed the currently excited winding, from being decelerated rather than accelerated. At relatively low speeds, it is possible to force longer current pulses to achieve faster speed changes.

For example, the following procedure may be followed. If, for three consecutive excitation phases during which current is forced through the motor windings for 12 ms, no change of the position of the rotor is detected, then the duration of each excitation phase may be doubled to 24 ms. On the contrary, if for two consecutive excitation phases of 12 ms the rotor changes its position, then the duration of the excitation phase may be halved to 6 ms.

To clearly illustrate the various aspects of the present invention, let us consider a practical case of driving a three-phase star-connected brushless motor in which one winding at a time is brought to a high impedance state (tristate), while the other two windings are provided with a drive current. Of course, the start-up procedure of the invention may be advantageously applied to a motor with a greater number of phases, or with its windings not connected in a star configuration but in a polygonal (delta) configuration or independently connected.

Referring to Table 1, below, there are six possible ways to power a three-phase motor, corresponding to as many positions of the rotor.

TABLE 1

| Position | Input | Output |
| --- | --- | --- |
| 0 | B | C |
| 1 | A | C |
| 2 | A | B |
| 3 | C | B |
| 4 | C | A |
| 5 | B | A |

Depending on the current position of the rotor, a current may be forced for a certain period of time according to one of the above-indicated current paths. A preferred start-up procedure of the invention is illustrated in detail in FIG. 2, where each parameter is defined according to the following Table 2:

TABLE 2

| | |
| --- | --- |
| p1 | number of consecutive excitation phases of equal duration during which a change of the rotor position has not occurred |
| P1 | maximum number of consecutive excitation phases of equal duration during which changes of the rotor position may not occur |
| p2 | number of consecutive excitation phases of equal duration during which a change of the rotor position has occurred |
| P2 | maximum number of consecutive excitation phases of equal duration during which a change of the rotor position may occur |
| K | number of possible positions of the rotor (in a three-phase motor K = 6) |
| T | duration of a period of excitation phase (between two successive tests) |
| TargetT | minimum duration of the time interval T |
| Pos | current position of the rotor |
| PrevPos | position previously occupied by the rotor |
| TargetPos | target final position |
| E | position congruent with the drive current path during an excitation phase |
| S | angular distance between the current position Pos and the position E |
| N | number of positions to be tested (beside the last position) to identify the current position |

The first step includes making the values of p1 and p2 equal to zero, and assigning desired values to the other parameters.

Figure 2:
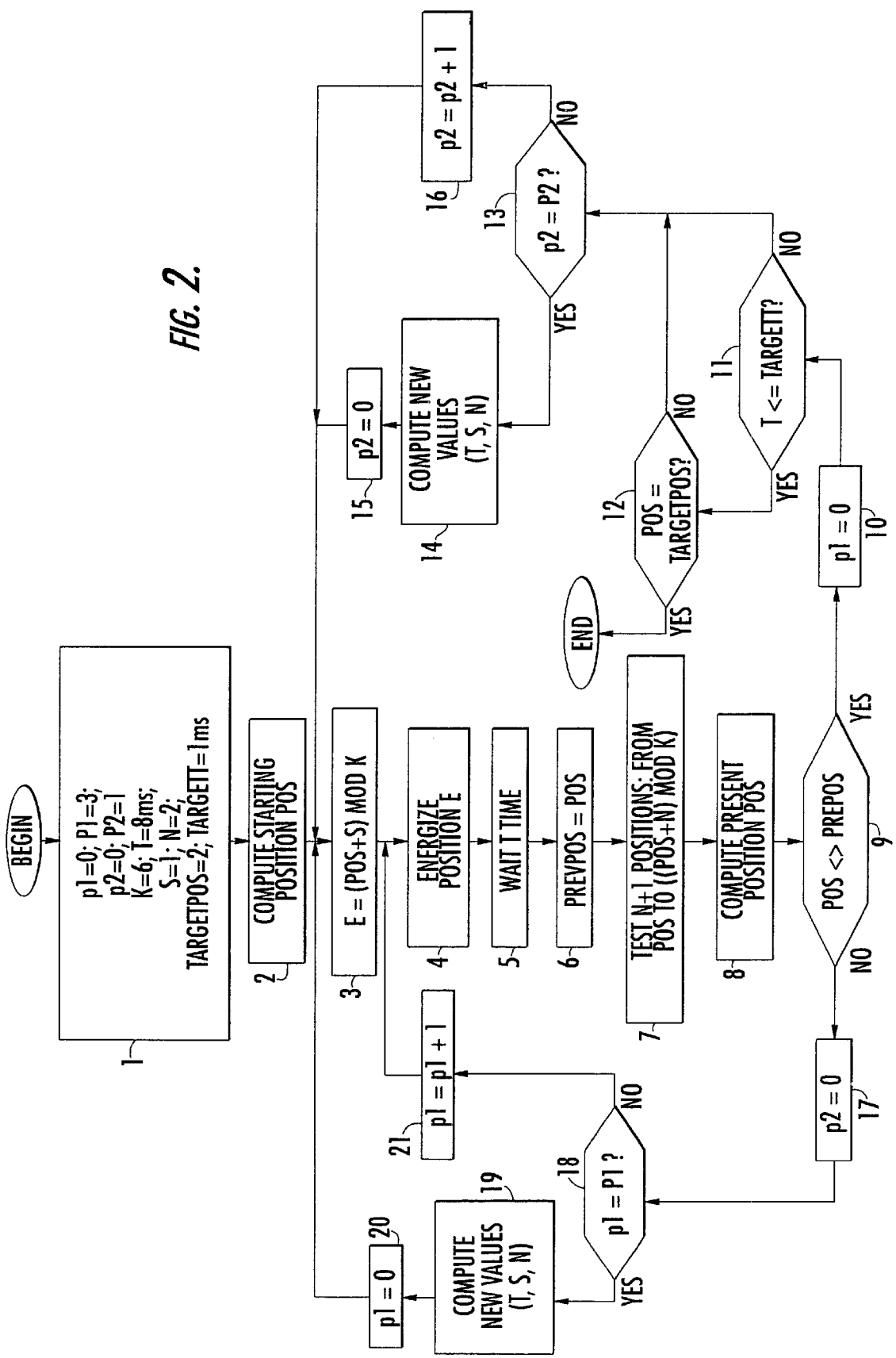
FIG. 2 is a flow chart of one embodiment of the method of the invention.

In the example of FIG. 2 in particular, the duration of an excitation phase is set to 8 ms, while the start-up process is halted if such a duration is less than 1 ms and if the rotor is simultaneously in the position 2. In the successive step (block 2), the initial position of the rotor is determined, for example, by the inductive sensing technique, or by aligning the rotor with a predefined position.

Once the position Pos of the rotor is determined or fixed, another phase E is excited (following the starting position (phase) in the desired direction of rotation) that is at S positions (phases) after the starting position, as seen at blocks 3 and 4, for a time T (block 5). The position E is chosen such that its angular position from the starting or current position Pos is S positions, where S a parameter whose value is assigned. The parameter S may assume integer values ranging between 1 and half the number of positions (phases) of the rotor, which is 3 in the present example. This maximum value is preferably defined because values greater than that would tend to make the rotor rotate in a direction opposite to the desired direction.

In block 6 the last detected position is stored, while in block 7 verification of the chosen N+1 positions corresponding to the current position (block 8) is performed. Finally, the last detected position Pos is compared with the preceding one PrevPos to verify whether the rotor has translated or not. If Pos is equal to PrevPos (block 9), the counting of the changes of the consecutive positions p2 (block 17) is set to zero, while the number of consecutive times p1 in which the rotor has not moved is compared (block 18) with the respective maximum number P1.

The value of p1 is incremented (block 21) if it has not yet reached its maximum value. Hence, the motor is excited using the same drive current path (block 4) of the preceding excitation phase. In the contrary case, new values are set (block 19) for the parameters T, S and N and the count p1 is set to zero (block 20). The new values of T and N should preferably be greater than the preceding ones.

In the present example, T is doubled and N is increased by a unit (e.g., from 2 to 3), while the new value of S will be less than the preceding one or unchanged (e.g., by setting S=1). Finally, the motor is driven according to a scheme corresponding to a new position E angularly incremented S positions from Pos, in the direction of rotation. If the rotor has moved (block 9), the count p1 is set to zero (block 10) and the speed is assessed to ascertain whether the established speed has been reached or not. This is done by comparing the duration T of the excitation phase with the minimum value TargetT (block 11). If T≦TargetT, then the current position Pos is detected to determine whether it coincides with the pre-established TargetPos. If this is verified, the routine is then terminated.

In the event the start-up procedure is terminated upon reaching the required speed, regardless of the position of the rotor, the block 12 is preferably omitted or disabled. In block 13 the count p2 of the number of phases of the same duration during which a change of the position of the rotor has occurred is compared with the respective maximum allowed value P2. If p2 has not yet reached the maximum value P2, it is incremented (block 16) before verifying the drive current path of the position E according to which the motor is excited during the successive excitation phase (block 3). On the contrary, the values of the parameters T, S and N are updated (block 14), for example, by halving T, decreasing N and increasing S, while setting the count p2 to zero (block 15).

The start-up procedure of the invention provides for a rapid start-up of the motor and ensures that the speed of the rotor, and optionally its position as well, at the end of the start-up have predetermined values.

That which is claimed is:

1. A start-up method for a multiphase brushless motor comprising phase windings and a rotor to be accelerated until reaching a final speed, the method comprising:
   determining a starting position of the rotor;
   performing an excitation phase comprising forcing a drive current in at least one of the phase windings of the motor for a predetermined period of time according to a switching sequence for inducing a rotation in a desired direction;
   sensing a position reached by the rotor at the end of the excitation phase; and
   increasing or reducing the predetermined period of time and modifying the switching sequence for a next excitation phase based upon a number of consecutive times a current position of the rotor is found to be the same or different from a previously sensed position, respectively.

2. The start-up method of claim 1 further comprising interrupting the start-up method when the final speed has been reached or exceeded.

3. The start-up method of claim 1 further comprising:
   counting a number of consecutive excitation phases of equal duration during which the position of the rotor is the same as the previously sensed position; and
   increasing the predetermined period of time for the next excitation phase and forcing current through one of the phase windings at a distance not greater than the current position during a successive excitation phase if the count exceeds a predetermined value.

4. The start-up method of claim 1 further comprising:
   counting a number of consecutive excitation phases of equal duration during which the position of the rotor is different from the previously sensed position; and
   decreasing the predetermined period of time for the next excitation phase and forcing current through one of the phase windings at a distance not less than the current position during a successive excitation phase if the count exceeds a predetermined value.

5. The start-up method of claim 1 further comprising aligning the rotor in a predetermined initial position.

6. The start-up method of claim 1 wherein sensing the position reached by the rotor comprises inductively sensing at least one of the phase windings of the motor.

7. The start-up method of claim 1 wherein sensing the position reached by the rotor comprises inductively sensing only the phase windings adjacent the previously sensed position.

8. The start-up method of claim 7 wherein a number of the phase windings subjected to inductive sensing is incremented or decremented based upon the number of consecutive times the sensed position is respectively the same or different from the previously sensed position.

9. The start-up method of claim 1 further comprising terminating the start-up method based upon the rotor reaching the final speed and a final position.

10. The start-up method of claim 1 further comprising generating an error signal and interrupting the start-up method after an error period has elapsed after beginning the start-up method.

11. A start-up method for a multiphase brushless motor comprising phase windings and a rotor to be accelerated until reaching a final speed, the method comprising:
   determining a starting position of the rotor;
   performing an excitation phase comprising forcing a drive current in at least one of the phase windings of the motor for a predetermined period of time according to a switching sequence for inducing a rotation in a desired direction;
   sensing a position reached by the rotor at the end of the excitation phase;
   counting a number of consecutive excitation phases of equal duration during which the position of the rotor is the same or different from a previously sensed position;
   increasing the predetermined period of time for a next excitation phase and forcing current through one of the phase windings at a distance not greater than a current position of the rotor during a successive excitation phase if the count exceeds a first predetermined value; and decreasing the predetermined period of time for the next excitation phase and forcing current through one of the phase windings at a distance not less than the current position of the rotor during the successive excitation phase if the count exceeds a second predetermined value.

12. The start-up method of claim 11 further comprising interrupting the start-up method when the final speed has been reached or exceeded.

13. The start-up method of claim 11 further comprising aligning the rotor in a predetermined initial position.

14. The start-up method of claim 11 wherein sensing the position reached by the rotor comprises inductively sensing at least one of the phase windings of the motor.

15. The start-up method of claim 11 wherein sensing the position reached by the rotor comprises inductively sensing only the phase windings adjacent the previously sensed position.

16. The start-up method of claim 15 wherein a number of the phase windings subjected to inductive sensing is incremented or decremented based upon the number of consecutive times the sensed position is respectively the same or different from the previously sensed position.

17. The start-up method of claim 11 further comprising terminating the start-up method based upon the rotor reaching the final speed and a final position.

18. The start-up method of claim 11 further comprising generating an error signal and interrupting the start-up method after an error period has elapsed after beginning the start-up method.

19. A start-up method for a multiphase brushless motor comprising phase windings and a rotor to be accelerated until reaching a final speed, the method comprising:
   aligning the rotor in a predetermined initial position;
   performing an excitation phase comprising forcing a drive current in at least one of the phase windings of the motor for a predetermined period of time according to a switching sequence for inducing a rotation in a desired direction;
   sensing a position reached by the rotor at the end of the excitation phase by inductively sensing at least one of the phase windings of the motor; and
   increasing or reducing the predetermined period of time and modifying the switching sequence for a next excitation phase based upon a number of consecutive times a current position of the rotor is found to be at least one of the same or different from a previously sensed position, respectively.

20. The start-up method of claim 19 further comprising interrupting the start-up method when the final speed has been reached or exceeded.

21. The start-up method of claim 19 further comprising:
   counting a number of consecutive excitation phases of equal duration during which the position of the rotor is the same as the previously sensed position; and
   increasing the predetermined period of time for the next excitation phase and forcing current through one of the phase windings at a distance not greater than the current position during a successive excitation phase if the count exceeds a predetermined value.

22. The start-up method of claim 19 further comprising:
   counting a number of consecutive excitation phases of equal duration during which the position of the rotor is different from the previously sensed position; and
   decreasing the predetermined period of time for the next excitation phase and forcing current through one of the phase windings at a distance not less than the current position during a successive excitation phase if the count exceeds a predetermined value.

23. The start-up method of claim 19 wherein sensing the position reached by the rotor comprises inductively sensing only the phase windings adjacent the previously sensed position.

24. The start-up method of claim 23 wherein a number of the phase windings subjected to inductive sensing is incremented or decremented based upon the number of consecutive times the sensed position is respectively the same or different from the previously sensed position.

25. The start-up method of claim 19 further comprising terminating the start-up method based upon the rotor reaching the final speed and a final position.

26. The start-up method of claim 19 further comprising generating an error signal and interrupting the start-up method after an error period has elapsed after beginning the start-up method.

27. A multiphase brushless motor comprising:
   a plurality of phase windings;
   a rotor to be accelerated by said pluarity of phase windings until reaching a final speed; and
   a controller coupled to said plurality of phase windings for
      determining a starting position of said rotor,
      performing an excitation phase comprising forcing a drive current in at least one of said phase windings of the multiphase brushless motor for a predetermined period of time according to a switching sequence for inducing a rotation of said rotor in a desired direction,
      sensing a position reached by said rotor at the end of the excitation phase, and
      increasing or reducing the predetermined period of time and modifying the switching sequence for a next excitation phase based upon a number of consecutive times a current position of said rotor is found to be the same or different from a previously sensed position, respectively.

28. The multiphase brushless motor of claim 27 wherein said controller further counts a number of consecutive excitation phases of equal duration during which the position of said rotor is the same as the previously sensed position, and increases the predetermined period of time for the next excitation phase and forces current through one of said phase windings at a distance not greater than the current position during a successive excitation phase if the count exceeds a predetermined value.

29. The multiphase brushless motor of claim 27 wherein said controller further counts a number of consecutive excitation phases of equal duration during which the position of said rotor is different from the previously sensed position, and decreases the predetermined period of time for the next excitation phase and forces current through one of said phase windings at a distance not less than the current position during a successive excitation phase if the count exceeds a predetermined value.

30. The multiphase brushless motor of claim 27 wherein said controller senses the position reached by said rotor by inductively sensing at least one of said phase windings of the motor.

31. The multiphase brushless motor of claim 27 wherein said controller senses the position reached by said rotor by inductively sensing only said phase windings adjacent the previously sensed position.

32. The multiphase brushless motor of claim 31 wherein said controller increases or decreases a number of said phase windings subjected to inductive sensing based upon the number of consecutive times the sensed position is respectively the same or different from the previously sensed position.

* * * * *